United States Patent Office 2,978,025
Patented Apr. 4, 1961

2,978,025

FRACTURING WELL FORMATIONS

Joseph B. Clark, Jr., Tulsa, Okla., assignor to Pan American Petroleum Corporation, Tulsa, Okla., a corporation of Delaware No Drawing. Filed Feb. 18, 1957, Ser. No. 640,570

8 Claims. (Cl. 166—42)

This invention relates to the hydraulic fracturing of formations penetrated by a well to increase the permeability and producing capacity of those formations. More specifically, this invention is directed to an improved method of for fracturing permable oil, gas, or water producing formations axially of a well which penetrates such formations and includes particularly a method of limiting the extension of such fractures axially beyond a desired position along the well.

Wells have been fractured axially along the bore to increase the productivity of the formations penetrated by the well. An axial fracture, often referred to as a vertical fracture, is known to increase the gross permeability and accordingly the productivity of several formations including formations having striations or variations in permeability. This is particularly desirable since the productivity of relatively impermeable zones is increased considerably in proportion to the productivity where only horizontal fractures are produced, horizontal fractures being the name given to those fractures which are substantially perpendicular to the axis of the well and which generally extend along bedding planes intersected by the well. These horizontal fractures tend to be produced in the more permeable zones due to the initial permeability of the zones. Thus, in a typical horizontal fracturing operation the permeability of the least permeable zones remains unaffected. Vertical fractures in a well partially overcome this difficulty and tend to increase the permeability of all zones proportionately regardless of initial permeability. One major difficulty, however, with vertical fracturing has been the inability to limit the axial or vertical extent of vertical fractures so that they do not extend into permeable zones which produce undesirable fluids. In an oil producing well, for example, the oil zone is typically located between a water producing zone on the bottom and a gas producing zone on the top. To increase the productivity of the oil producing zone and not at the same time increase the productivity of the water or gas zones, I have found that vertical fractures produced in the oil zone are desirably terminated approximately at the oil-water contact or at the oil-gas contact, respectively.

It is, therefore, an object of this invention to provide an improved method for limiting the axial extension, up or down or both up and down, of a vertical fracture produced in a well. It is another object of this invention to provide an improved method for limiting the extension of a vertical fracture by first producing a horizontal fracture above and/or below the zone which is to be vertically fractured. It is a more specific object of this invention to provide an improved method for increasing the oil/water and/or oil/gas ratio of an oil producing well by first producing one or more horizontal fractures which are desirably located at approximately the oil-water interface and/or at the gas-oil contact in a well and then fracturing an oil producing formation vertically one or more times to increase the productivity of the oil producing zone. Other objects of this invention will become apparent from the following description.

In brief, this invention comprises an improved method of fracturing formations involving, first, producing either a horizontal fracture at the upper desired limit of a vertical fracture and/or producing a horizontal fracture at the lower desired limit of a vertical fracture, impermeabilizing such previously produced horizontal fracture or fractures, preferably temporarily, and then producing one or more vertical fractures in the zone defined by the upper and/or lower limits.

Fractures produced by the hydraulic fracturing process are typically horizontal fractures, i.e., they extend radially into fluid producing formations from a well, the plane of the fracture being substantially perpendicular to the axis of the well. These fractures are horizontal because, as is now well-known, horizontal fractures result when formation penetration fluids are injected into a permeable formation and a high fracturing pressure is then applied. By using such fluids which penetrate the permeable rock formations to a limited extent, the rocks appear to be pried or wedged apart by hydraulic action which has a magnified or enlarged effect vertically, lifting the effective overburden and causing an initial horizontal fracture which is extended deep into the formation by continued application of pressure and injection of fluid. Various penetrating fluids, often referred to as "low-penetrating" fluids, which will produce these horizontal fractures are well-known in the art. Also water or oil, typically unmodified crude oil, or the less viscous refined hydrocarbons such as kerosene, diesel oil, fuel oil and the like, are known to initiate or produce short horizontal fractures. The low-penetrating fluids, such as those described in Reissue Patent 23,733 to Farris, also initiate and may be used to produce deep-penetrating horizontal fractures. Such low-penetrating fluids include modified water and oil having a filtrate rate in the standard A.P.I. filter press test of less than about 100 cc. and greater than about 25 cc. of fluid in 30 minutes. Colloidal materials are generally added to various base fluids to produce these modified or low-penetrating fluids. For example, 3–5 percent starch or other water soluble polysaccharides such as the water soluble gums or celluloses are added to water. Similarly, light hydrocarbons may be modified by the addition of such colloids or gelling agents as oil soluble soaps or asphalts or long chain hydrocarbon polymers. Any of these liquids which, with respect to the natural liquids in the well such as water or crude oil, has a considerably retarded tendency to filter through the formations but which will filter through the formations to some extent are herein referred to in this specification and claims as low-penetrating fluids. Fuel oil or other oils containing sufficient solids such as asphalt to produce a low fluid loss at bottom hole conditions in the range of about 25–100 cc. is preferred.

In addition to these low-penetrating fluids for producing horizontal fractures, another fracturing fluid is also employed to produce vertical fractures. Fracturing fluids of this latter type are herein referred to as "non-penetrating" fluids. As used in this specification and claims, a non-penetrating fluid refers to a fracturing liquid which, with respect to the low-penetrating fluid as above defined, has a considerably reduced tendency to filter through the formations and is generally considered to be like good drilling fluids, i.e., it cannot be injected into or filtered through the pores of the rock formations to any appreciable extent. This ability of the vertical fracturing fluids to resist penetration into the pores of a formation is indicated by the A.P.I. fluid loss or filtrate rate of the fluids. A vertical fracturing fluid or a non-penetrating fluid, for the purpose of this specification and claims, therefore specifically refers to a liquid having a filtrate rate of typically less than about 10 cc. in 30 minutes in the standard filtration apparatus and procedure described in the A.P.I. RP 29, section IV, on Filtration. Preferably, the filtrate rate with this apparatus and procedure is substantially less than 10 and is typically betwee nabout 0 and about 5 cc. in 30 minutes. Fluids of this type are well-known in the art; an example is water containing about 5–20 percent pregelatinized starch or water soluble cellulose, e.g., carboxy methyl cellulose.

A suitable peptizer or breaker which will reduce the viscosity and/or increase the filtrate rate is usually incorporated in the low-penetrating fluid and particularly in the non-penetrating fluid. Breakers of this type include acid generating substances, various enzymes such as pectin which destroy the polysaccharides, etc. As the terms "fracturing fluid," "low-penetrating fluid," "non-penetrating fluid," "horizontal fracturing fluid," and "vertical fracturing fluid" are understood and used herein they therefore include where desirable, suitable incorporated peptizers or breakers as are deemed necessary for removing the fluids from the formations.

In operation, if not already known, it is generally advisable to determine first the desired axial length of a proposed vertical fracture. The boundaries of a formation which produces the desired fluid are, therefore, ascertained before a fracture is produced. In an oil producing formation, for example, the oil-water and/or gas-oil contacts are first determined by logging techniques well-known in the art, e.g., by fluid electrical conductivity at points of fluid entry. Knowing the desired upper and/or lower boundaries, horizontal fractures are then produced approximately at these boundaries, i.e., at the boundary or in some cases a few feet from the boundary—preferably in the formation producing the desired fluid—by a selective fracturing process such as those employing isolating packers, particularly straddle packers, or by such processes as those described in copending application S.N. 271,419, now Patent No. 2,788,072. In these processes a zone in the well is isolated so that a horizontal fracture can be produced at the desired boundary. The low-penetrating fluid is then injected into the confined zone at the desired elevation in the well under a pressure great enough to fracture the formation horizontally, i.e., under the horizontal fracturing pressure. If desired, the horizontal fracturing or low-penetrating fluid may contain sand or other propping agent as well-known in the art and the fracture, after being initiated either by the low-penetrating fluid or by some other fluid such as crude oil or water, can be extended to any desired distance by the continued injection of horizontal fracturing fluid. From about 25 to about 1000 barrels of this horizontal fracturing fluid may be injected into the formation to initiate and to extend the fracture. The horizontal fracture thus produced can be used to limit either the lower or the upper extension of a vertical fracture subsequently produced. If the first horizontal fracture thus produced is at the desired lower extremity of a proposed vertical fracture and it is desired to limit the extension of a subsequently produced vertical fracture at an upper elevation, a horizontal fracture may then be placed selectively at the upper boundary, e.g., the oil-gas contact—the same procedure being used to produce the upper horizontal fracture as is used to produce the lower horizontal fracture. Obviously, the upper horizontal fracture can be produced prior to the lower horizontal fracture. In some cases only one, and in some cases, more than two limiting horizontal fractures are produced. In an oil producing formation where there is no active water drive and no apparent lower water producing formation but there is a problem of high gas/oil ratio, only the limiting upper horizontal fracture is necessary. Alternatively, if there is a lower active water drive and no high gas/oil ratio problem then only the limiting lower horizontal fracture is produced.

After either the lower or the upper horizontal fracture or both the lower and upper fractures have been produced at the desired elevations, those fractures are plugged to a substantial depth in the formation. These fractures and any other highly permeable formations exposed in the zone which is to be vertically fractured may first be isolated from the remainder of the well by packers, casing, cement plugs or the like, and then may be plugged by any of a number of means. One procedure for plugging these regions of high permeability is disclosed in copending application S.N. 617,377, now Patent No. 2,838,166. This procedure involves generally injecting in the well, or any zone therein which is isolated from the remainder of the well, a slurry of bridging materials, preferably oil soluble or other "temporary" bridging materials, in a low-penetrating fluid. The bridging materials are typically granular solids having a particle size throughout the range of about 4–100 mesh U.S. sieve and a concentration in the range of about 50–300 pounds per barrel of the low-penetrating fracturing fluid. Granulated naphthalene alone or in combination with granulated hard nutshells is a preferred bridging agent. This slurry of from about 10–100 barrels or more of a low-penetrating fluid containing granulated bridging material is injected into the well until a high pressure develops indicating that all high permeability zones and previously produced fractures are sealed. Generally, the development of a bottom hole pressure in p.s.i., equal to the depth of the well in feet times about 0.6 or greater, indicates that previously produced fractures have been sealed and that the walls of the well have been sufficiently impermeabilized by the sealing agent so that when the vertical fracturing fluid is subsequently injected it will not be lost to the formation through these permeable zones.

Other means for sealing such horizontal fracture or fractures can be substituted. A very desirable procedure involves plugging these fractures with an oil soluble rosin polymer which produces an impermeable plug in a formation when contacted by water. After a horizontal fracture is produced by injecting a low-penetrating fluid into the formation, a water insoluble rosin polymer dissolved in a solvent may be injected into the fracture to produce an annular barrier or plug in the formation. This plugging solution, as described in copending application Serial Number 631,277, now Patent No. 2,946,383 to Bearden, Murphy and Scott involves injecting a solution of certain rosin polymers in a water miscible solvent into the fracture. The polymers are preferably produced by the sulfuric acid polymerization of rosin dissolved in a solvent such as gasoline, benzene, and carbon tetrachloride. The molecular weight of the resulting polymers, is at least about 450 and the softening point is at least about 100° C. by the ASTM ball and ring method. Higher molecular weight polymers are preferred. This polymer is dissolved in a water miscible solvent such as methanol or isopropanol, the solvent containing at least 50 percent by weight of the rosin polymers and the solution being injected into the well in sufficient amount to extend back into the fracture for several feet, typically 25–50 feet. This normally involves a volume of about 1000–5000 gallons of the polymer solution in each fracture but the amount injected depends only upon the desired extent of the plug which in turn depends upon the desired depth of any vertical fracture. Sand or other props may be carried into the fracture and placed with this solution since the solution typically has a viscosity of about 100 centipoises. A preferred plugging composition from an economic standpoint and for technical reasons contains about 32 percent methanol, 8 percent isopropanol, and 60 percent rosin polymers, all percentages being by weight. This polymer remains mobile until contacted by water. When contacted by water it precipitates the rosin polymer which becomes immobile and substantially completely plugs the fractures or pores containing the solution. Accordingly, when an aqueous type vertical fracturing fluid contacts this solution in the horizontal fracture, the aqueous fluid substantially instantaneously precipitates the rosin polymer and plugs the horizontal fracture at the point of contact, thus preventing loss of the vertical fracturing fluid through the previously produced horizontal fracture and limiting the extension of the vertical fracture vertically beyond the horizontal fracture. This polymer being oil soluble and water insoluble, the fracture remains plugged until oil encroaches and dissolves the plug. This permits the fracture to produce oil at a high rate even if the polymer has been precipitated therein.

In still another modification the horizontal fracture is permanently plugged with a water and oil insoluble plugging material such as hydraulic cement. This plugging agent may also be injected into the fracture or other very permeable zones either as a fracturing fluid or as a follower for a horizontal fracturing fluid. Low-water-loss cements, i.e., those cement slurries which when tested in the above described A.P.I. filtration apparatus produce a low A.P.I. filtrate rate in the range of about 25–100 cc., is an example of a combined horizontal fracturing or low-penetrating fluid and plugging agent of the desired type. Such fluids are desirable due to their ability to produce an initial set which substantially immobilizes the slurry in a horizontal fracture and thus prevents the loss of subsequently injected vertical fracturing fluid into the horizontal fracture. Additionally, these low-water-loss cements when set in horizontal fractures produce a barrier which is impermeable to water, gas, and oil, and thus prevent vertical migration of the undesired fluids into the zone producing a desired fluid. In this embodiment the vertical fracture is produced before the cement slurry develops sufficient strength to transmit a stress great enough to allow the vertical fracture to jump the horizontal fracture. Any of these sealing agents may be used in either the upper or lower horizontal fracture or both.

After any horizontal fracture or fractures are thus produced and plugged, the non-penetrating or vertical fracturing fluid is displaced down the well, either into the confined zone including the upper and lower sealed horizontal fractures or preferably into a confined zone between the plugged horizontal fractures. Pressure is then applied to the non-penetrating fluid and, due to the fact that this fluid will not leak away into the pores of the well walls, the well walls react structurally like closed chamber walls. Thus, the tangential forces at the well wall are substantially greater than the vertical or axial forces and, therefore, the formation rocks tend to rupture along the axis of the well, i.e., along a substantially vertical plane. After the vertical fracture has thus been initiated it may be extended substantially indefinitely or until the fracture is extended laterally into the formation to the depth of the annular plug in a horizontal fracture by the continued injection of the vertical fracturing fluid or by the injection of a low-penetrating fluid. That is, after the vertical fracture is initiated a non-penetrating fluid is not required to extend the fracture. Any number of vertical fractures may be produced in the isolated zone, while the horizontal fractures are still plugged, by plugging, either permanently or, preferably, temporarily, vertical fractures previously produced. Previously produced vertical fractures can be plugged or sealed using the same procedure described above for the sealing or plugging of horizontal fractures. The plug is, however, desirably only temporary so that vertical fractures in the zone producing the desirable fluid will all produce.

It will be apparent that by thus first producing a horizontal fracture at a desired elevation in a well, the extent of a fracture subsequently produced along the axis of a well can be limited vertically so that it will not extend up or down beyond the horizontal fracture, providing that the vertical fracture is produced while the previously produced horizontal fracture is still plugged with a material which will not transmit the forces involved in fracturing beyond the horizontal fracture. It will also be apparent that whether the horizontal fractures are either temporarily or permanently plugged, they will limit the vertical extension of axial fractures from oil producing or other zones which produce desired fluids and prevent extension thereof into zones which produce undesirable fluids. It will also be apparent that this invention is susceptible to a wide variety of embodiments and should, accordingly, be construed to be limited only by the scope of the appended claims.

I claim:

1. A method of fracturing a formation axially of a well penetrating said formation and limiting the axial extension of such fractures comprising first fracturing said formation horizontally, plugging the horizontal fracture in said formation thus produced over a substantial area around said well, and then fracturing said formation axially of said well at a level in said formation such that said horizontal fracture serves as a terminus for one end of said axial fracture.

2. A method of fracturing a formation axially of a well penetrating said formation and limiting the axial extension of such fractures comprising injecting into said formation a low-penetrating fluid under sufficient pressure to produce a fracture along a horizontal plane, plugging said fracture to a substantial depth, and then injecting into said well a non-penetrating fluid under sufficient pressure to produce a fracture axially of said well in said formation limited at one end by said horizontal fracture.

3. A method of fracturing a formation axially of a well penetrating said formation and limiting the axial extension of the axial fracture comprising locating in said well the elevation of the interface between zones producing desirable and undesirable fluids, isolating said desirable zone from said undesirable zone fracturing said formation at said elevation along a horizontal plane by injecting a low-penetrating fluid selectively into said formation at said elevation, plugging said fracture to a substantial depth in said formation by injecting a plugging solution into said formation at said elevation and then injecting into said isolated desirable zone a non-penetrating fluid at a pressure sufficient to produce a vertical fracture in said formation, and producing said well.

4. A method of fracturing an oil producing zone of a formation axially of a well penetrating said formation and limiting the axial extension of such fracture downward into an adjacent water producing zone comprising injecting a low-penetrating fluid into said well selectively at about the elevation in said well of the interface between said water producing zone and said oil producing zone, said low-penetrating fluid being injected into said formation at sufficient pressure to produce a horizontal fracture at said elevation, injecting into said horizontal fracture a plugging agent to impermeabilize said fracture for a substantial distance from said well, isolating an interval of said well within said well producing zone and then injecting into said interval at a level above the elevation of said horizontal fracture a vertical fracturing fluid having substantially zero filtrate rate in the standard A.P.I. filtration test, and displacing said vertical fracturing fluid into said oil producing zone at a pressure great enough to produce a fracture into said formation axially of said well.

5. A method according to claim 4 which includes the step of logging said well prior to the injection of said low-penetrating fluid into said well to determine the location of the interface between said oil zone and said water zone.

6. A method of fracturing an oil producing formation axially of a well penetrated by said formation and preventing the extension of said axial fracture into adjacent water and gas producing formations comprising logging said well to determine the elevations of the oil-water interface and the oil-gas interface, injecting a low-penetrating fluid into an isolated zone of said well opposite said elevations at a pressure sufficient to produce horizontal fractures at said interfaces, injecting into said horizontal fractures a sufficient amount of a slurry of an oil soluble bridging material in a low-penetrating fluid to plug said fractures for a substantial distance around said well, isolating the zone between said interfaces, thereafter injecting into said isolated zone a non-penetrating fluid and displacing said non-penetrating fluid into said oil producing formation at a pressure great enough to fracture said oil producing formation axially of said well, whereby the vertical fracture produced by the injection of said non-penetrating fluid into said oil producing formation is limited vertically by said horizontal fractures and does not extend into said water and gas producing formations.

7. A method of vertically fracturing an oil producing formation penetrated by a well and limiting the extension of the vertical fracture thus produced so that it does not extend into an upper gas producing formation or a lower water producing formation comprising isolating a first zone in said well at the top of said oil producing formation and at the bottom of said gas producing formation, injecting a first quantity of low-penetrating fluid into said first isolated zone and displacing it by pumping into the adjacent formation at a rate and at a pressure great enough to produce a horizontal fracture, isolating a second zone in said well at the elevation of the bottom of said oil producing formation and the top of said water producing formation, injecting into said second isolated zone and into said formation by pumping a second quantity of low-penetrating fluid at a sufficient rate and under sufficient pressure to produce a second horizontal fracture, injecting into said horizontal fractures a sufficient amount of a slurry of an oil soluble bridging material in a third quantity of low-penetrating fluid to seal said horizontal fractures for a substantial distance around said well, isolating a third zone in said well between said horizontal fractures, injecting into the third isolated zone a non-penetrating fluid, applying to said non-penetrating fluid a pressure great enough to fracture said oil producing formation axially of said well, pumping a quantity of non-penetrating fluid into the oil producing formation via the axial fracture to extend said axial fracture, and producing said well to cause oil to contact and remove said oil soluble bridging material from the horizontal fractures producing oil.

8. A method of fracturing an oil producing zone of a formation axially of a well penetrating said formation and limiting the axial extension of such fracture downward into an adjacent water producing zone comprising injecting a low-penetrating fluid into said well selectively at about the elevation in said well of the interface between said water producing zone and said oil producing zone, said low-penetrating fluid being injected into said formation at sufficient pressure to produce a horizontal fracture at said elevation, injecting into said horizontal fracture a sufficient amount of a plugging agent comprising a rosin polymer dissolved in a water miscible solvent to plug said horizontal fracture for a substantial distance around said well, said rosin polymer being precipitated upon contact with water to plug said fracture, isolating said oil producing zone from said water producing zone at about the interface between these zones, thereafter injecting into said isolated zone of said well within said oil producing zone above the elevation of said horizontal fracture a water base vertical fracturing fluid having substantially zero filtrate rate in the standard A.P.I. filtration test, and displacing said vertical fracturing fluid into said oil producing zone at a pressure great enough to produce a fracture in said formation axially of said well.

References Cited in the file of this patent

UNITED STATES PATENTS

| | | |
|---|---|---|
| 2,366,036 | Leverett et al. | Dec. 26, 1944 |
| 2,596,845 | Clark | May 13, 1952 |
| 2,645,291 | Voorhees | July 14, 1953 |
| 2,699,213 | Cardwell et al. | Jan. 11, 1955 |
| 2,734,861 | Scott et al. | Feb. 14, 1956 |
| 2,758,653 | Desbrow | Aug. 14, 1956 |
| 2,798,557 | Sewell | July 9, 1957 |
| 2,819,761 | Popham et al. | Jan. 14, 1958 |
| 2,848,052 | Stinson | Aug. 19, 1958 |

UNITED STATES PATENT OFFICE
CERTIFICATE OF CORRECTION

Patent No. 2,978,025                     April 4, 1961

Joseph B. Clark, Jr.

It is hereby certified that error appears in the above numbered patent requiring correction and that the said Letters Patent should read as corrected below.

Column 2, lines 3 and 4, for "methof" read -- method --; line 18, for "penetration" read -- penetrating --; column 3, line 6, for "betwee nabout" read -- between about --; column 6, line 61, for "well", second occurrence, read -- oil --.

Signed and sealed this 9th day of January 1962.

(SEAL)
Attest:

ERNEST W. SWIDER
Attesting Officer

DAVID L. LADD
Commissioner of Patents